(12) United States Patent
Richman et al.

(10) Patent No.: US 8,521,333 B2
(45) Date of Patent: Aug. 27, 2013

(54) METHOD AND APPARATUS FOR FLUE GAS RECIRCULATION

(75) Inventors: Mark Richman, Westminster, MD (US); Michael Hoeg Nielsen, Ellicott City, MD (US); Ralph Joseph Lebron, Bel Air, MD (US)

(73) Assignee: Andritz Environmental Solutions, Columbia, MD (US)

( * ) Notice: Subject to any disclaimer, the term of this patent is extended or adjusted under 35 U.S.C. 154(b) by 894 days.

(21) Appl. No.: 12/386,461

(22) Filed: Apr. 17, 2009

(65) Prior Publication Data
US 2009/0271039 A1    Oct. 29, 2009

Related U.S. Application Data

(60) Provisional application No. 61/124,475, filed on Apr. 17, 2009.

(51) Int. Cl.
*G05B 13/02*    (2006.01)

(52) U.S. Cl.
USPC ........... 700/277; 700/266; 700/274; 700/276; 700/278; 700/280; 700/281; 700/282; 454/8; 454/9; 454/15; 454/16; 454/17; 454/20; 454/26; 454/61; 454/239; 454/256; 236/14; 236/15 BR; 236/15 C

(58) Field of Classification Search
USPC .............. 700/276–282, 266; 236/14, 15 BR, 236/15 C; 454/239, 61, 256, 8, 9, 15–17, 454/20, 26
See application file for complete search history.

(56) References Cited

U.S. PATENT DOCUMENTS

| 6,779,735 | B1 * | 8/2004 | Onstott ........................... 236/13 |
| 6,787,263 | B2 * | 9/2004 | Walsh et al. ................... 429/410 |
| 2003/0051723 | A1 * | 3/2003 | Gunawardena et al. .... 126/21 A |
| 2003/0198855 | A1 * | 10/2003 | Walsh et al. .................... 429/34 |

* cited by examiner

*Primary Examiner* — Jill Warden
*Assistant Examiner* — Shogo Sasaki
(74) *Attorney, Agent, or Firm* — Ober, Kaler, Grimes & Shriver; Royal W. Craig

(57) ABSTRACT

An improved method and system for flue gas recirculation (FGR) from the ID Fan located downstream of a scrubber (or other Air Quality Control Equipment including cyclones, baghouses, etc., hereafter "AQC equipment") back to the scrubber (or other AQC Equipment) inlet to maintain the minimum required flue gas throughput during low-load conditions, thereby eliminating the need for a separate booster fan. A flue gas recirculation duct is connected from downstream of the ID Fan to the inlet of the scrubber (or other AQC Equipment). A variable flow restrictor is placed in the duct downstream of the ID Fan for controlling pressure of the recirculated flue gas. The flow restrictor is controlled in accordance to a function of boiler load or flue gas flow to produce the required backpressure that enables the flue gas to flow through the recirculation duct back to the inlet of the scrubber (or other AQC Equipment) at low loads. This side stream of treated gas is recirculated from the discharge of the ID Fan to the inlet of the AQC Equipment to maintain the appropriate gas velocity regardless of boiler load conditions. The pressure differential between fan discharge and the AQC Equipment inlet enables recirculation of a sufficient amount of treated flue gas using only a small duct and simple flow control damper, without using a booster fan.

13 Claims, 2 Drawing Sheets

US 8,521,333 B2

METHOD AND APPARATUS FOR FLUE GAS RECIRCULATION

CROSS-REFERENCE TO RELATED APPLICATION(S)

The present application derives priority from U.S. provisional application Ser. No. 61/124,475 filed Apr. 17, 2009.

FIELD OF THE INVENTION

The present invention provides an improved method and system for using the existing Induced Draft Fan (ID Fan) of a boiler draft control system to drive flue gas through a recirculation duct to the inlet side of a scrubber-baghouse or other Air Quality Control System (AQC System) in order to maintain an optimal flue gas flow rate through the system during all load conditions, thereby eliminating the need for a separate recirculation/booster fan.

BACKGROUND OF THE INVENTION

Power companies' efforts to reduce sulfur dioxide and other emissions have focused largely on the use of advanced emission control equipment and improved operating practices. A number of different AQC Systems have evolved for flue gas cleaning including Baghouses, Dry Scrubbers and selective catalytic reduction (SCR) devices. In dry scrubbers, a reagent is introduced into a reactor where it mixes with the flue gas stream. The gaseous pollutants react with the chemicals in the reagent and are captured in a dry solid form that is then removed by the downstream particulate collector. These scrubbers can reduce acid gas emissions by more than 95 percent. Some scrubbers as well as other pollution control devices, such as cyclones, require a minimum gas velocity in order to operate properly. This is not a problem when a power plant is operating at high-load conditions because the flue gas flow rate can support the operation of the pollution control equipment. However, it may become a problem during low load conditions and may cause the AQC System to shut down. With the advent of new air pollution control regulations that do not permit any periods of non-compliance, even during boiler start-up and shutdown, taking the AQC System offline at low load is no longer an option. This has driven pollution control system manufacturers to add Flue Gas Recirculation (FGR) systems to their equipment in order to maintain the flow through the AQC System above the minimum operating velocity during all boiler load conditions.

The FGR system recirculates a portion of the treated flue gas back into the inlet of pollution control equipment, thereby increasing its volumetric throughput to a level at or above the minimum required to operate the equipment. The FGR system typically consists of a duct connecting the discharge side of the ID Fan with the inlet duct of the scrubber (or other AQC Equipment), a control damper in that duct to regulate the amount of gas that is recirculated and flow measuring devices to allow the control system to determine the amount of gas being recirculated and the total amount of gas flowing through the AQC system.

As the boiler load drops, the ID Fan throttles down the flow through the AQC equipment, lowering the discharge pressure of the fan and also diminishing the draft at the inlet of the AQC system. As a result very little differential pressure (or motive force) remains to drive the recirculation flow from the ID Fan outlet duct to the AQC system inlet duct making it impossible to maintain the required volumetric flow. The commonly accepted practice to remedy this problem is to install a booster fan in the recirculation duct to increase the flow and achieve the required recirculation flow rate. This fan is a large piece of equipment and would typically be driven by a motor as large as 500 to 2000 HP thus requiring a Medium Voltage switchgear starter, auxiliary bearing lubrication system, as well as various instruments for monitoring fan performance and status. The installed cost of this package could be substantial.

It would be advantageous to provide a more economical FGR system that does not require the addition of a booster fan, instead using the existing ID fan to provide the motive power for the recirculation gas flow.

SUMMARY OF THE INVENTION

In an Air Quality Control System (AQC System) comprised of a scrubber, a baghouse, a precipitator, a mechanical collector, a catalytic reactor or other AQC device, with an ID fan downstream of the AQC System drafting the flue gas through the AQC equipment and discharging it to the exhaust chimney, a flue gas recirculation duct is connected from the outlet duct of the ID Fan to the inlet duct of the AQC equipment. A modulating flow restrictor is placed inside the duct connecting the ID Fan with the chimney, located downstream of the recirculation duct branch connection point. This flow restrictor provides the back-pressure necessary to force the recirculation gas flow through the recirculation duct back to the inlet of the AQC system. The flow restrictor is controlled as a function of the boiler load or flue gas flow to increase the fan back-pressure at low loads. For example, the flow restrictor may be controlled in accordance with a boiler firing rate signal, a flue gas flow rate signal, or other indicator of boiler load. This function may be of a modulating type, of a multi-stepped type or of a single step type. Using the ID Fan motive force, a controlled slipstream of the treated gas is recirculated from the discharge of the ID Fan to the inlet of the AQC equipment to maintain the appropriate gas velocity regardless of boiler load. The induced pressure differential between fan discharge duct and the AQC equipment inlet duct enables recirculation of gas using only a small duct and a simple flow control damper.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

Although the drawings represent embodiments of various features and components according to the present invention, certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF THE PREFERRED EMBODIMENTS

The present invention is an economical Flue Gas Recirculation (FGR) system for AQC Systems which comprise various types of equipment such as a baghouse, a scrubber, a catalytic reactor, an electrostatic precipitator or any other flue gas treatment device. The FGR System improvement claimed under this invention eliminates the need for a booster fan, replacing it with an adjustable flow restrictor in the outlet duct of the ID Fan and a modulating damper in the recirculation duct.

Figure 1:
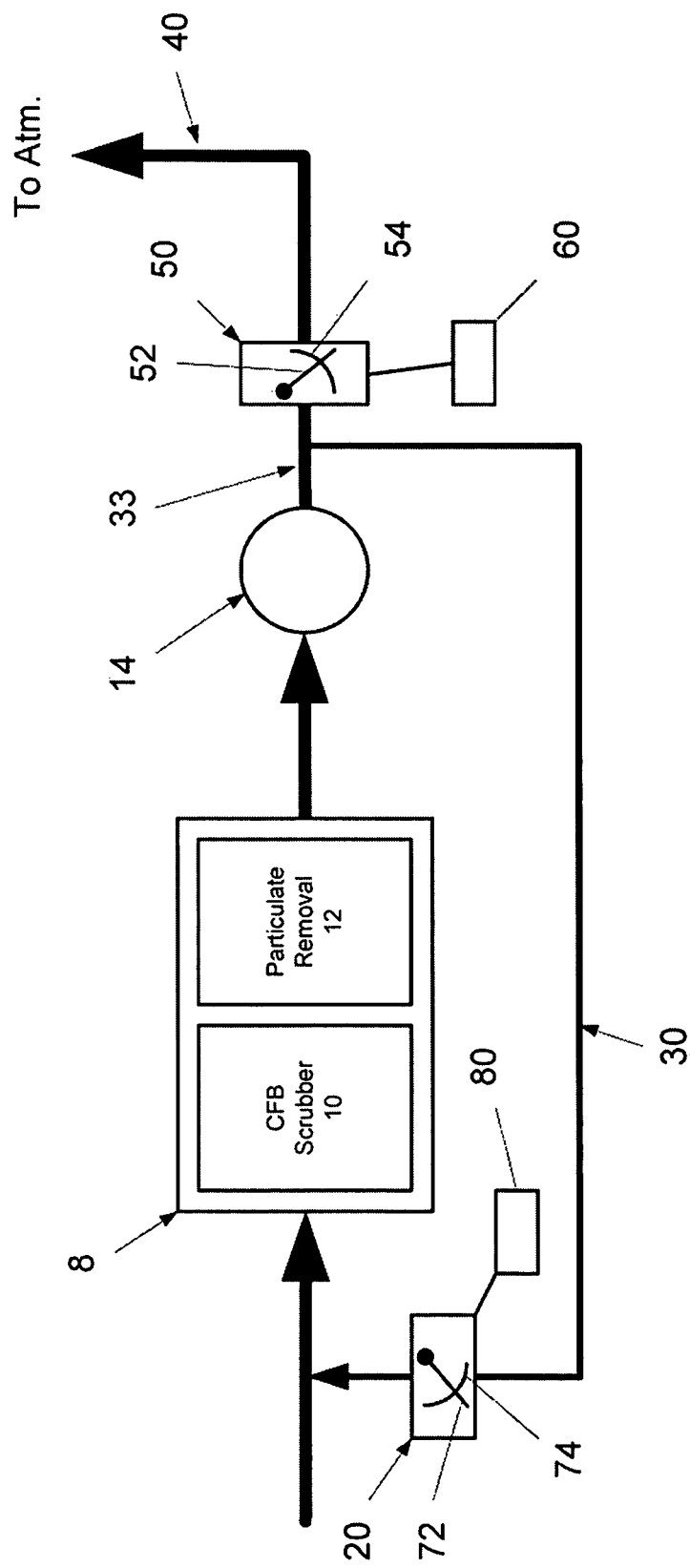
FIG. 1 is a diagram of one embodiment of the present invention incorporated in an Air Quality Control System (AQC System) (8) comprising a Circulating Fluidized Bed (CFB) Scrubber 10 operatively connected to a particulate removal device (12).

FIG. 1 is a diagram of one embodiment of the present invention incorporated in an Air Quality Control System (AQCS) (8) comprising a circulating fluidized bed (CFB) scrubber (10) operatively connected to a particulate removal device (12). The CFB scrubber is a well-established dry scrubber used widely for boilers burning a wide range of fuels including coal (bituminous, sub-bituminous and PRB), pet coke, peat and biomass. The particulate removal device (12) may be any of a number of known particulate removal devices including an electrostatic precipitator, a fabric filter or a cyclone.

An Induced Draft Fan (14) is connected to particulate removal device (12) for exhausting the treated flue gas through a chimney (40) to atmosphere. The Induced Draft Fan (14), hereafter ID Fan, is a high volume fan located downstream of the AQC System (8) and before the chimney (40) and typically the largest power consumer in a fossil fuel power plant. The Flue Gas Recirculation duct (30) connects the ID Fan outlet duct (33) to the CFB scrubber (10) inlet duct.

In accordance with the present invention, a variable flow restrictor (50) is interposed downstream of the junction of the ID Fan outlet duct (33) with the recirculation duct (30). The variable flow restrictor (50) includes an adjustable mechanical restriction (52) located inside the fan outlet duct. The adjustable mechanical restriction (52) may be an adjustable louver damper or other device placed in the ductwork downstream of the ID Fan (14). The adjustable mechanical restriction (52) is connected to an automatic actuator (54) controlled by a position controller (60) which drives the restriction (52) to any position between fully open (100%) and partially restricted. This permits it to adjust the backpressure in the flue gas outlet duct (33) needed to ensure that a sufficient amount of gas is available for recirculation through the FGR duct.

In addition, an FGR flow control device (20) is located in the FGR duct (30). The FGR flow control device (20) is comprised of an adjustable damper (72), connected to an automatic actuator (74) controlled by a position controller (80), which permits it to adjust the volumetric flow of gas through the FGR duct (30). The FGR damper can be adjusted to any position between fully open (100%) and fully closed (0%). Thus, the FGR flow control device (20) allows the control system to adjust the amount of flue gas being recirculated to meet the minimum gas velocity requirement of the CFB Scrubber (10).

The position controllers (60, 80) slave to a control device which implements the control logic according to the present invention. The control device may be tied to, or part of, the boiler central control system. This control device may comprise a suitable programmable logic controller (PLC), a distributed control system (DCS), a central computer, a series of interconnected discrete control components, or any combination thereof.

By partially closing the variable flow restrictor (50), the static pressure at the fan discharge is increased, enabling a fraction of the flue gas that would normally exit the system through the chimney (40) to be forced into the recirculation duct (30). As the variable flow restrictor (50) starts closing, the FGR flow control device (20) is opened to allow the controlled flue gas flow to return to the CFB scrubber inlet duct. The recirculated flue gas is combined with the incoming flue gas from the boiler to increase the total flow entering the AQC system (8) when the boiler flue gas flow alone would be insufficient to keep the CFB Scrubber (10) in service.

As the boiler load decreases, the variable flow restrictor (50) is further closed and the FGR flow control device (20) is opened to force more flow through the recirculation duct. As the boiler load increases, the FGR flow control device (20) gradually closes and the variable flow restrictor (50) gradually opens until they are respectively fully closed and fully open. Since the ID Fan (14) is typically used to control boiler draft, and because the variable flow restrictor (50) and FGR flow control device (20) affect both flow and pressure at the ID fan (14) it is critical to prevent interaction between the draft control loop and the recirculation flow control loop. Therefore the variable flow restrictor (50) and FGR flow control device (20) are both controlled based on boiler load or flue gas flow in an open loop control scheme.

The primary advantage of this system is the elimination of any booster fan and associated equipment, resulting in reduced capital costs and operations/maintenance expenses. Additional benefits are the reduction in equipment footprint and a simpler control scheme.

Since the function of the FGR system is to raise the AQC System gas velocity above the minimum operating threshold, it does not require continuous dynamic control to maintain a specific flow rate. The function that determines the position of the variable flow restrictor (50) may be a single step change triggered by low boiler load. The actual control signal being sent to the position controller (60) is preferably subjected to rate-of-change limits to allow the boiler draft control loop to absorb the change as the adjustable mechanical restriction (52) changes position.

The above-described configuration requires certain operating parameters, as follows:
1) The adjustable mechanical restriction (52) is physically limited, so it cannot be closed beyond a predetermined partially-closed position and can therefore never fully interrupt the flue gas path.
2) The control system has the ability to override the signals sent to the controllers (60, 80) to drive both devices (20, 50) to a fully open position during a Master Fuel Trip and subsequent gas path purge as required by the National Fire Protection Association (NFPA).

Figure 2:
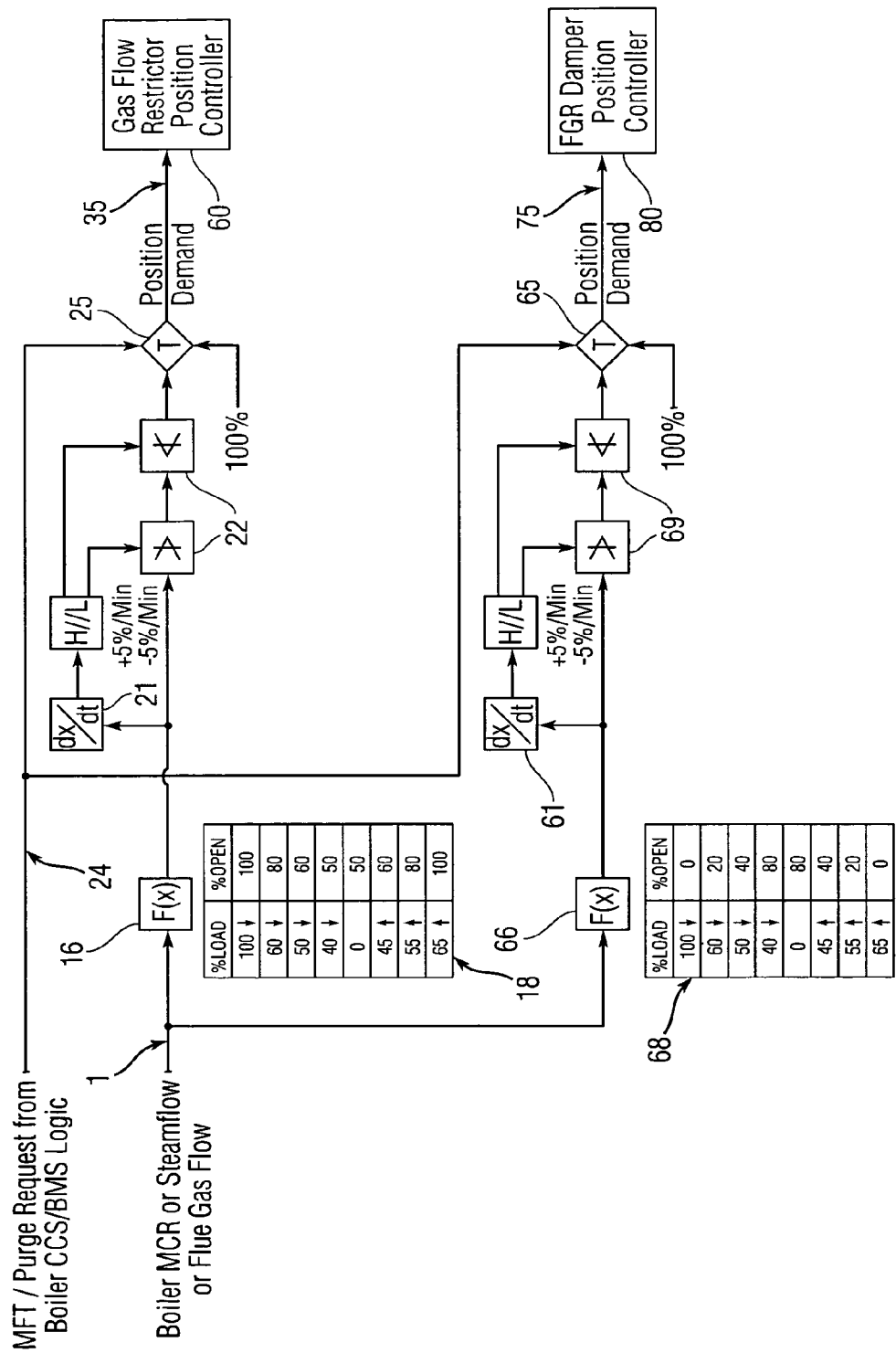
FIG. 2 is a logic diagram of the open loop control algorithm which modulates the FGR damper and the Gas Flow Restrictor as a function of boiler load or flue gas flow.

FIG. 2 is a composite flow diagram of a typical detailed open loop control software employed by the control system which modulates recirculation flow as a function of boiler load or flue gas flow.

The boiler load signal (1) is fed to two function blocks (16, 66) associated respectively with the variable flow restrictor (50) and the FGR flow control device (20). The function blocks (16, 66) correlate each load condition to a position for the two control devices (50, 20). An example of such correlations is given in tables (18) and (68). The correlation may be a continuous analog function or, as shown in the example, a series of discrete steps. Thus the processing logic receives the boiler load or flue gas flow periodically and adjusts the variable flow restrictor (50) through position controller (60) pursuant to lookup table (18). Similarly, the processing logic adjusts the FGR flow control device (20) through position controller (80) pursuant to lookup table (68).

In the example each step is set and reset with a 5% dead band to prevent the controllers from fluttering back and forth multiple times as the load passes through each of the step onset thresholds.

In operation, by way of example, between boiler loads of 100% and 60%, the variable flow restrictor (50) position is 100% open while the FGR flow control device (20) is fully closed. As the load drops below 60% the restrictor (50) is closed to 80% position while the FGR flow control device (20) opens to 20%. For the step to be reversed, the boiler load has to rise above 65% due to the 5% deadband. Successive steps take place at 10% increments on decreasing load until the boiler load reaches 40%, the restrictor is down to 50% open and the FGR flow control device is 80% open. This combination provides for the maximum recirculation flow and allows operation down to very low boiler load.

The output signal from the function blocks (16 and 66) is checked for rate of change (at 21, 61), and limiters (22, 62) prevent the signals (35, 75) going to the Position Controllers (60, 80) from changing too rapidly as this would cause a major upset to the boiler draft control loop. When a MFT/Purge command is received at input (24) from the Boiler Logic two override transfer switches (25, 65) bypass the rate of change limiters outputs and instantly force the control signal to both position controllers (60, 80) to fully open.

It should now be apparent that the combination of a variable flow restrictor (50) placed inside the duct connecting the ID fan (14) with the chimney (40), and the FGR flow control device (20), under a common control system as a measure of boiler load or flue gas flow, serves to maintain the appropriate gas velocity regardless of boiler load, thereby eliminating the need for a booster fan.

Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

We claim:

1. In an air quality control system comprising a boiler having a flue gas exhaust, a scrubber having an inlet duct coupled in fluid communication with the flue gas exhaust of said boiler, an induced draft (ID) fan having an inlet connected in fluid communication downstream of said scrubber and an outlet, and an exhaust chimney coupled by an exhaust duct to the outlet of said ID fan for exhausting treated flue gas, an improvement comprising an apparatus for recirculating flue gas from the exhaust duct downstream of said ID fan to upstream of said scrubber, the flue gas recirculation apparatus further comprising:
a recirculating duct connected at one end at a junction to said exhaust duct, and connected at another end to said scrubber inlet duct;
a low load flue gas recirculation device restricting said exhaust duct downstream of said junction, said low load flue gas recirculation device further comprising a variable flow restrictor located inside said exhaust duct to selectively induce backpressure in the exhaust duct forcing flue gas into said recirculation duct, a first actuator engaged to said variable flow restrictor for varying the position thereof between fully open and partially restricted, and a first position controller connected to said first actuator for electronic positioning of said actuator and flow restrictor anywhere between said fully open and partially restricted positions;
a flue gas recirculation flow control damper located in said recirculation duct between said junction and said scrubber inlet duct, said flue gas recirculation damper further comprising a variable position damper located inside said recirculation duct to selectively vary flue gas recirculation to said air quality control system input, a second actuator engaged to said variable position damper for varying a position thereof between fully open and fully closed, and a second position controller connected to said second actuator for electronic positioning of said second actuator and variable position damper anywhere between said fully open and fully closed positions;
a computer controller programmed with control software comprising computer instructions stored on non-transitory computer memory for controlling said first and second position controllers, and in communication with said master boiler controller for deriving there from two control signals, for controlling both of said first and second position controllers to meet the minimum flue gas velocity requirement of the air quality control system.

2. The system for recirculating flue gas according to claim 1, wherein said variable flow restrictor comprises an adjustable louver damper.

3. The system for recirculating flue gas according to claim 1, wherein said variable flow restrictor is mechanically limited so that it cannot be closed beyond said partially restricted position and can therefore never fully close said exhaust duct.

4. The system tier recirculating flue gas according to claim 1, wherein when said computer controller receives a master fuel trip (MFT)/Purge request signal, said control software automatically causes said computer controller to open both the variable flow restrictor and FGR flow control damper to said fully open positions.

5. The system for recirculating flue gas according to claim 1, wherein said control software compares the boiler load or flue gas flow to a lookup table of upper and lower thresholds, and adjusts the variable flow restrictor position accordingly.

6. In an air quality control system comprising a boiler having a flue gas exhaust, a scrubber having an inlet duct coupled in fluid communication with the flue gas exhaust of said boiler, an induced draft (ID) fan having an inlet connected in fluid communication downstream of said scrubber, and an outlet, and an exhaust chimney coupled by an exhaust duct to the outlet of said ID fan for exhausting treated flue gas, an improvement comprising an apparatus recirculating flue gas from the exhaust duct downstream of said ID fan to upstream of said scrubber, the flue gas recirculation apparatus further comprising:
a recirculating duct connected at one end at a junction to said exhaust duct, and connected at another end to said scrubber inlet duct;
a low load flue gas recirculation device restricting said exhaust duct downstream of said junction, said low load flue gas recirculation device further comprising a variable flow restrictor located inside said exhaust duct to selectively induce backpressure in the exhaust duct forcing flue gas into said recirculation duct, an actuator engaged to said variable flow restrictor for varying the position thereof between fully open and partially restricted, and a position controller connected to said actuator for electronic positioning of said actuator and variable flow restrictor anywhere between said fully open and partially restricted positions;
a computer controller programmed with control software comprising computer instructions stored on non-transitory computer memory for controlling said position controller, and in communication with said master boiler controller for deriving there from a signal for controlling said low load flue gas recirculation device to provide sufficient pressure to operate the flue gas recirculation system.

7. The system for recirculating flue gas according to claim 6, wherein said variable flow restrictor comprises an adjustable louver damper.

8. The system for recirculating flue gas according to claim 6, wherein said variable flow restrictor is mechanically limited so that it cannot be closed beyond said partially restricted position and can therefore never fully close said exhaust duct.

9. The system for recirculating flue gas according to claim 6, wherein when said computer controller receives an master fuel trip (MFT)/Purge request signal, said control software automatically causes said computer controller to open said variable flow restrictor to said fully open position.

10. The system for recirculating flue gas according to claim 1, wherein said control software compares the boiler load or flue gas flow to a lookup table of upper and lower thresholds, and adjusts the variable flow restrictor position accordingly.

11. The system for recirculating flue gas according to claim 10, wherein said control software adjusts said upper and lower thresholds within a preset dead band.

12. The system for recirculating flue gas according to claim 6, wherein said control software compares the boiler load or flue as flow to a lookup table of upper and lower thresholds, and causes said computer controller to adjust the variable flow restrictor position based on said comparison.

13. The system for recirculating flue gas according to claim 12, wherein said control software adjusts said upper and lower thresholds within a preset dead band.

\* \* \* \* \*